United States Patent [19]
Gryctko

[11] 3,963,322
[45] June 15, 1976

[54] TORQUE CONTROLLING SET SCREW FOR USE WITH THE CABLE OF SOLDERLESS CONNECTORS, OR THE LIKE

[75] Inventor: Carl E. Gryctko, Haddon Heights, N.J.

[73] Assignee: ITE Imperial Corporation, Spring House, Pa.

[22] Filed: Jan. 23, 1975

[21] Appl. No.: 543,317

[52] U.S. Cl. .................... 339/272 R; 85/61
[51] Int. Cl.² ......................... H01R 11/10
[58] Field of Search ............ 339/272; 85/61, 62

[56] References Cited
UNITED STATES PATENTS

| | | | |
|---|---|---|---|
| 2,830,635 | 4/1958 | Thorstens | 85/61 |
| 3,171,708 | 3/1965 | Salomone | 339/272 |
| 3,498,174 | 3/1970 | Schuster et al. | 85/61 |
| 3,561,317 | 2/1971 | Rowell | 85/61 |
| 3,865,007 | 2/1975 | Stanback | 85/61 |

*Primary Examiner*—Joseph H. McGlynn
*Attorney, Agent, or Firm*—Ostrolenk, Faber, Gerb & Soffen

[57] ABSTRACT

In certain applications, such as solderless cable connectors, a set screw is used to provide the connection between two or more current conductors. The set screw should be tightened to no more than a predetermined tightening torque. This is automatically accomplished by providing a section along the length of the set screw that is weakened to a predetermined extent, which causes the screw to break at the section upon attainment of the predetermined tightening torque. Both portions of the separated screw include means for being engaged for tightening or loosening the screw.

4 Claims, 14 Drawing Figures

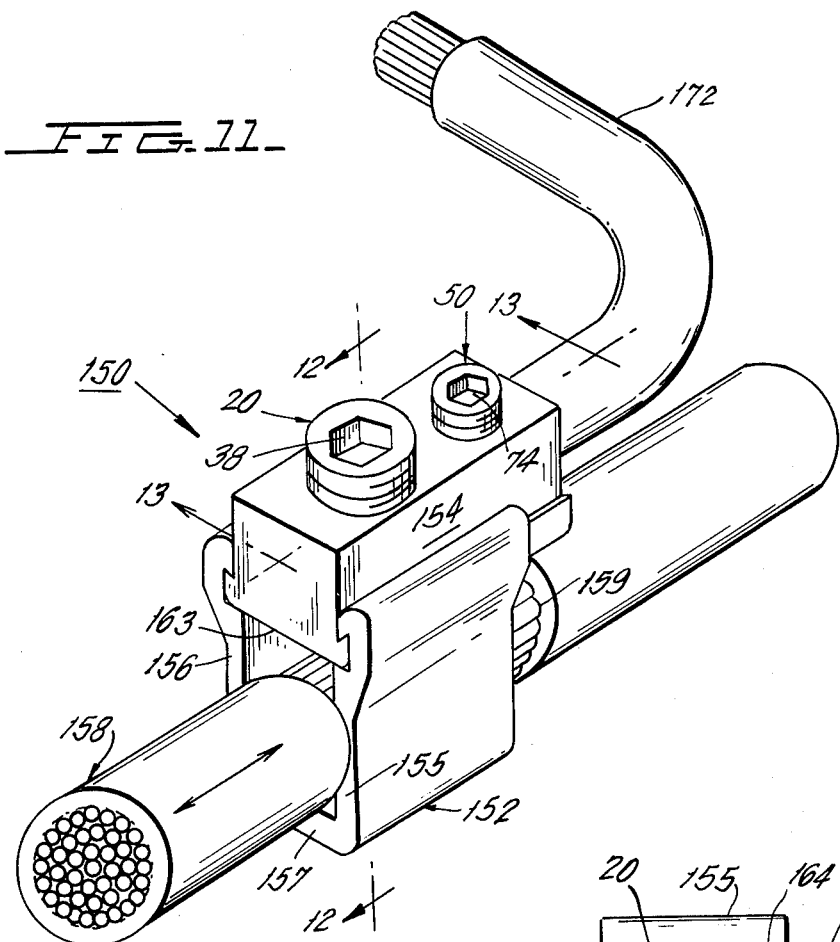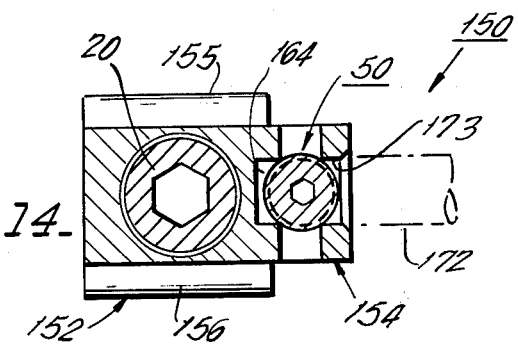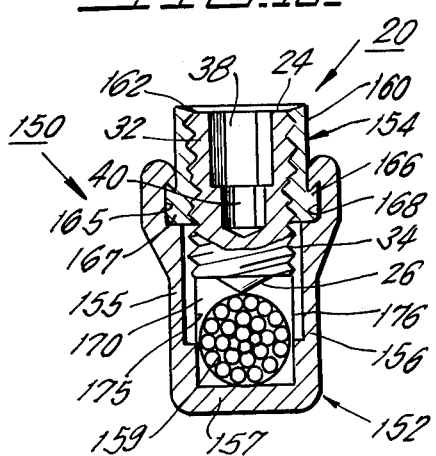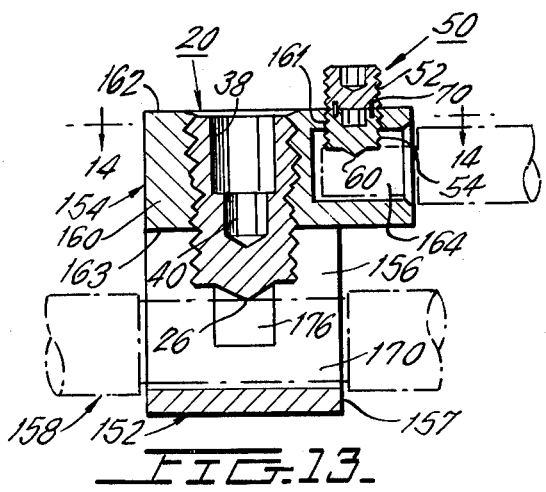

TORQUE CONTROLLING SET SCREW FOR USE WITH THE CABLE OF SOLDERLESS CONNECTORS, OR THE LIKE

BACKGROUND OF THE INVENTION

This invention relates to set screws in general and more particularly to a set screw used as the conductor clamping element in a solderless connector of the type disclosed and claimed in application Ser. No. 414,697 filed Nov. 12, 1973 entitled "Riser Panel Lug", now Pat. No. 3,876,279, and assigned to the assignee hereof. A set screw is tightened through a tapped threaded aperture by a tightening means, i.e. a screw driver, Allen wrench, or the like, until the tip of the screw engages an object and then the screw is tightened further by application of more torque until the set screw holds the object being engaged with desired force.

In certain applications, the force to be exerted by the tightened set screw should be closely regulated. For example, in the solderless cable connector in aforesaid application Ser. No. 414,697, the cable set screws must be tightened sufficiently, but not excessively, to ensure an effective connection between two or more current conductors. Insufficient tightening of the set screw may lead to overheating of the joint or may permit the clamped cable to be undesirably removed. Overtightening of the set screw may result in damage to the connector, inter alia, through stripping of the screw threads which guide the motion of the set screw.

SUMMARY OF THE INVENTION

In accordance with the invention, a set screw is provided wherein the maximum tightening torque to which the screw can be subjected is automatically controlled. When the tightening torque exceeds the predetermined maximum level, the set screw breaks and cannot be further tightened. Most broadly expressed, the invention comprises providing a weakened section in the set screw at some location along its length between the tightening means receiving fixture at the head of the set screw and the tip of the screw which engages the item to be secured.

The screw may be a single unit having a weakened section at which the set screw breaks or it may be comprised of two sections, one adjacent to the head and the other adjacent to the tip, which sections are joined together at the weakened section by breakable material with a shear strength at the maximum predetermined torque.

In a one piece screw first embodiment of the invention, the thickness of the screw is reduced at a location along its length, thereby providing at that location a weakened section which shears at the predetermined torque. In another embodiment employing a one piece screw, the section of the screw which defines the slot in the screw head in which the tightening means is inserted is made breakable at the predetermined maximum torque, whereby the tightening means breaks off the removable portion of the set screw upon the predetermined maximum torque being attained.

In a further embodiment, the set screw is originally formed in two portions that are divided along the length of the set screw. Joining the two portions of the set screw is an array of pins that extend across the interface between the sections of the set screw and that are of the proper number, thickness and strength to be resistant to a torque up to the predetermined maximum torque, at which time the pins shear and the set screw is in two portions.

Whether the set screw was originally of the one piece or the two piece embodiment, when the predetermined maximum torque is exceeded, the screw will be in two separated pieces.

The head of the screw carries an appropriate tightening means receiving fixture, such as a screw driver head slot or wrench slot, for enabling removal of the head section of the set screw. The separated screw has a head portion and a tip portion. In that side of the tip portion that faces toward the head of the screw, there is formed a separate screw tightening and loosening means receiving fixture, such as a screw driver head receiving slot or a wrench receiving slot. By means of this fixture, the tip portion of the set screw can later be removed, loosened or further tightened, when desired.

As was previously noted, the invention is particularly useful in clamping together a plurality of conductors with the desired clamping force. A non-limiting example of the riser panel lug of aforesaid application Ser. No. 414,697 is described here, it being understood that other applications for the invention are contemplated. Power is often tapped from a main electric distribution cable that extends through a riser panel. This is accomplished without cutting the cable by simply stripping insulation from a short length of the main cable and then clamping a main lug thereto by a set screw according to the invention. Additional or branch cables are similarly connected to the main lug, whereby the main lug serves as a means for joining all of the connected cables and transmitting electricity therebetween.

It is the primary object of the invention to provide a set screw which can be tightened only up to a predetermined maximum torque.

It is a further object of the invention to provide such a screw which separates lengthwise in two sections upon attainment of the predetermined maximum torque.

It is another object of the invention to provide means enabling tightening and loosening of each of the separated sections of the set screw.

It is yet another object of the invention to provide an effective electrical connection between a cable and a lug.

It is another object of the invention to provide an improved riser lug.

These and other objects of the invention will become apparent after reading the following description of the accompanying drawings.

BRIEF DESCRIPTION OF THE DRAWINGS

FIG. 11 is a perspective view of a riser lug in which set screws according to the invention are incorporated;

FIGS. 12 and 13 are cross-sections taken along respective lines 12—12 and 13—13 of FIG. 11, looking in the direction of the respective arrows 12—12 and 13—13; and FIG. 14 is a cross-section taken through line 14—14 in FIG. 13, looking in the direction of arrows 14 therein.

DESCRIPTION OF THE PREFERRED EMBODIMENTS

In all of the embodiments, there is a head, a tip and either at the head or somewhere between the head and the tip of the screw, the screw or its shaft is weakened in a manner such that the shaft has a shear strength sufficient to prevent its breaking at and beneath a predetermined maximum tightening torque applied to the screw head by a tightening tool, but the shear strength is selected such that a tightening torque above the predetermined maximum torque applied to the screw head will break the screw or shaft of the screw at its weakened location.

Figure 1:
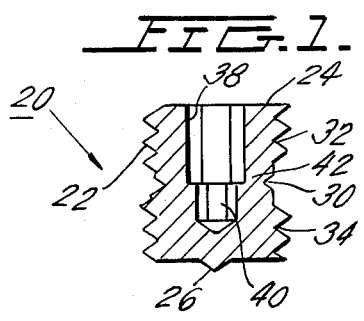
FIG. 1 is a side elevational view in cross-section of a first embodiment of a set screw in accordance with the invention.
Figure 2:
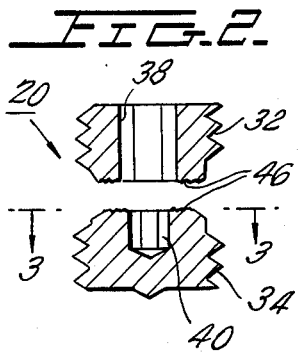
FIG. 2 is the same type of view as FIG. 1, showing the set screw thereof after it has been separated into its head portion and its tip portion.
Figure 3:
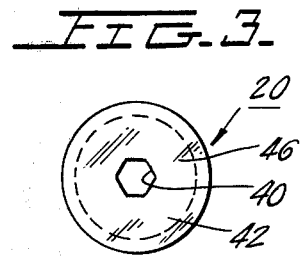
FIG. 3 is a top view of the tip portion of the screw of FIG. 1, as viewed in the direction of arrows 3 in FIG. 2.

The first embodiment of the screw shown in FIG. 1 is comprised of one piece screw 20. Screw 20 is comprised of a single molding or casting of steel or other appropriate material. As shown in FIG. 3, the screw 20 is circular in cross-section. As shown in FIG. 1, along the surface of the screw shaft is a regular helical thread 22 for being matingly received in a cooperatingly threaded tapped aperture.

In FIG. 1, screw 20 has a head 24 at its top and a tip 26 at its bottom. Tightening means is applied to the screw at or into its head 24, and when the screw is tightened, its tip 26 engages the object against which the screw is to be tightened.

The helical thread 22 is of constant diameter along the length of the screw. However, along the shaft of the screw between its head 24 and its tip 26, the body of the screw is substantially narrowed around the entire periphery of the screw at 30. With a unitary screw of one material, it is apparent that the narrowing of the width of the screw will result in a weakening at the narrowed section. Between head 24 and narrowed section 30 is the head portion 32 of the screw and between tip 26 and the narrowed section is the tip portion 34 of the screw.

Some fixture or means is required by which screw 20 is tightened. Extending inwardly from the head of the screw 24, generally toward tip 26, is the first tightening means receiving bore 38, which, as shown in FIGS. 1 and 3, is shaped for receiving an Allen wrench tightening tool, although an elongated slot for receiving a standard screwdriver head or another tightening tool receiving means may be formed at the head. It is to be noted that the tightening tool bore 38 is in the screw head portion 32, but does not extend down into the screw tip portion 34. Although bore 38 communicates with tip portion 34 and below described bore 40, bore 40 is smaller, precluding the tightening tool for bore 38 entering bore 40.

One further feature of the invention is that in the screw tip portion 34, there is formed the screw tip portion tightening tool receiving bore 40 which also is shaped so as to receive an Allen wrench tightening tool, but may be otherwise shaped for another type of tool. Bore 40 is narrower in width than bore 38, although this is not critical to the invention. What is critical about the existence of both of bores 38 and 40 is that both of the head portion 32 and the tip portion 34 of screw 20 are provided with respective tightening tool receiving means. Both of the means face in the direction toward head 24 of the screw.

The depth of the annular depression 30 into the exterior of screw 20 is selected to cooperate with the cross-sectional width of bore 38 toward which the depression extends, to define a rather radially thin annular ring 42 whose shear strength is obviously less than the shear strength of any other portion of screw 20 along the length of its shaft. The width of ring 42 is balanced with the shear strength of the material of which screw 20 is comprised so that ring 42 has a predetermined shear strength, which is at least as strong as the predetermined maximum torque that is desired to be applied to screw 20 upon its being tightened against an object by a tightening tool and which is not greater than that predetermined maximum torque. Obviously, due to variations in material quality and differences in material thicknesses due to tolerances in boring, casting, etc., there will be some variation in the shear strength of rings 42 of individual screws. However, the predetermined maximum torque at which the screw will shear can be selected fairly accurately.

Upon the torque applied to screw head 24 exceeding the predetermined maximum torque, the screw shaft will break at the weakened ring 42, causing the screw 20 to separate into separate head and tip portions 32, 34, respectively. The facing surfaces 46 of the two sections will be somewhat roughened at the break, although this will not present a problem.

One benefit of the breaking of the shaft of the screw at ring 42 is that thereafter, there are two separate screws in the tapped opening. The further tightening of the upper threaded screw comprising the head portion 32 will no longer also serve to tighten the other threaded screw comprised of the tip portion 34. It will instead serve to apply an axial force to tip portion 34, more tightly securing it in the threads of the tapped opening and securing it against either tightening or loosening.

When it is desired to remove screw 20 from the tapped opening into which it had previously been tightened, the head portion 32 of the screw is easily loosened by inserting a tightening tool in the original receiving means bore 38 and simply loosening the head portion 32. However, the tip portion still remains in this opening. It is to enable the removal of the now remaining tip portion that its tightening tool receiving opening 40 had been formed. A tightening tool is simply inserted in the receiving opening 40 and the tip portion of the screw 34 is also loosened and removed from the opening.

Figure 4:
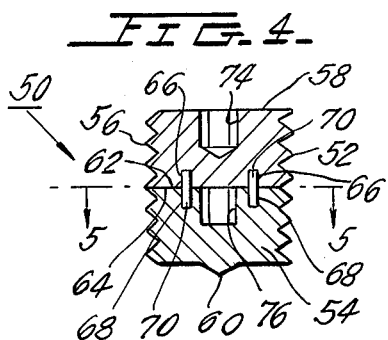
FIG. 4 is a side elevational view in cross-section of a second embodiment of screw in accordance with the invention.
Figure 5:
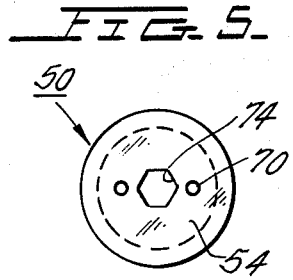
FIG. 5 is a top view in the direction of arrows 5 in FIG. 4 of the tip portion of the screw in FIG. 4.

Referring to FIG. 4, the second embodiment of screw 50 in accordance with the invention differs from the first embodiment 20 in that screw 50 is already preformed into separated head portion 52 and tip portion 54. The peripheral helical thread 56 along the exterior of screw 50 is continuous between the head 58 and tip 60 of the screw, without any changes in depth at any particular thread. The separate head section 52 has a bottom surface 62 which is flush with and abuts the top surface 64 of tip section 54. An appropriate number of preferably symmetrically arrayed, aligned bore sets 66, 68 are respectively formed in surfaces 62, 64. The cross-sections of each set of openings 66, 68 are carefully selected in order that a respective dowel pin 70 may be inserted and press fit in each aligned opening set, and the press fit of the dowel pin in the respective receiving openings holds the portions 52, 54 of the screw together. The number and cross-sections of the opening sets 66, 68 and the cross-sections of the dowel pins 70 and the shear strength of the material of which the dowel pins are comprised are all balanced to ensure that beyond a predetermined maximum torque applied to the head 58 of the screw, pins 70 will shear and screw 50 will separate into its portions 52, 54.

Correspondingly to tightening tool receiving bores 38, 40 of screw 20, screw 50 is provided with a head portion tightening tool receiving bore 74 facing toward its head 58 and a tip portion tightening tool receiving opening 76 extending in from its upper surface 64 which is facing toward head 58.

Both of tightening tool receiving means 74 and 76 of screw 50 are illustated as being of the Allen wrench receiving variety and both are indicated as being of the same cross-sectional width. It is apparent that within the context of the invention, other types of tightening tools may be used for tightening and removing the screw 50 and accordingly, other tightening tool receiving means may be substituted for the Allen wrench openings illustrated. (See, for example, the below described third embodiment of the invention.)

When screw 50 is tightened into a tapped, matingly threaded receiving opening, a tightening tool is inserted in tightening means receiving opening 74 and the entire screw is tightened until the predetermined maximum torque is achieved, at which time the screw separates into its portions 52, 54. Thereafter, when it is desired to remove screw 50 from its receiving opening, first the head portion 52 is removed by insertion of a tightening tool in tightening means receiving opening 74. Then the tip portion 54 of the screw is similarly removed by insertion of a tightening tool in the tightening tool receiving means 76 in tip portion 54. Other benefits and features of the second embodiment 50 of screw in accordance with the invention are similar to those enjoyed with the first embodiment, screw 20.

Figure 6:
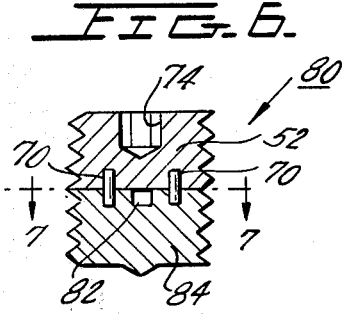
FIG. 6 is a side elevational view in cross-section of a third embodiment of screw in accordance with the invention.
Figure 7:
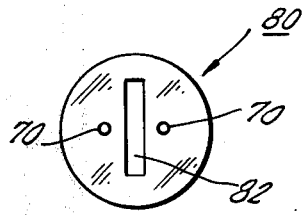
FIG. 7 is a top view in the direction of arrows 7 in FIG. 6 of the tip portion of the screw in FIG. 6.

Turning to FIGS. 6 and 7, the third embodiment 80 of screw in accordance with the invention differs from the second embodiment only in that in place of the Allen wrench receiving means opening in the tip portion 54 of screw 50, there is a standard elongated narrow width screw driver head slot opening 82 in the tip portion 84 of screw 80. All other elements of screw 80 are the same as the corresponding elements of screw 50 and have, therefore, been identically numbered.

Figure 9:
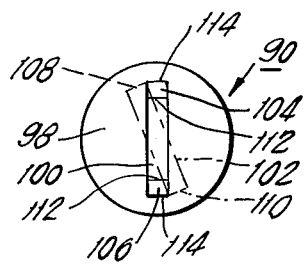
FIG. 9 is a top view of the screw in FIG. 8.
Figure 8:
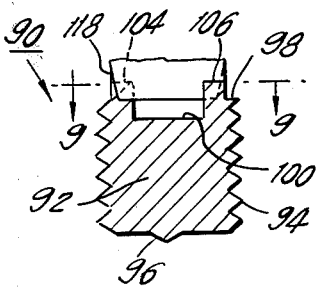
FIG. 8 is a side elevational view in cross-section of a fourth embodiment of screw in accordance with the invention.
Figure 10:
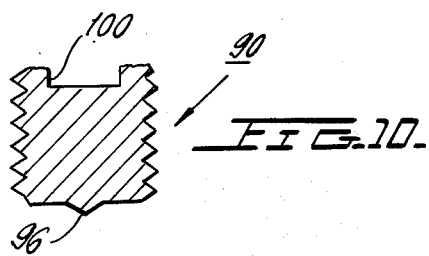
FIG. 10 is a side elevational view in cross-section of the fourth embodiment of FIG. 8 after the torque control means of the screw of FIG. 8 have been removed.

The fourth embodiment, FIGS. 8, 9 and 10, screw 90, is the same in concept as the preceding embodiments, but accomplishes the purposes of the invention in a somewhat different manner. Screw 90 is, like the first embodiment 20, a one-piece design including the unitary screw body 92 which is helically threaded at 94 on its surface. The tip 96 of the screw is the same as in the other embodiments. Where this embodiment differs is at its head 98. As shown in FIG. 9, head 98 is provided with two intersecting and partially overlapping slots 100, 102. Slot 100 as shown in FIG. 8 is deeper than slot 102 and, as shown in FIG. 10, slot 100 is the tightening tool receiving means that remains after the predetermined maximum torque has been applied to screw 90.

The opposite ends of slot 100 are defined by upstanding posts 104, 106 which, as shown in FIG. 8, were integrally cast with shaft 92 of screw 90 but, for example, might be inserted dowels like dowels 70 that are received in cooperating receiving openings at the head 98 of the screw, or may be other appropriate upstanding posts or abutments.

Slot 102 is adjacent to and angularly offset around the axis of screw 90 from slot 100. The length of slot 102 is such that its ends 108, 110 extend radially outwardly farther than the inner walls 112 of posts 104, 106, but not so far as the outer walls 114 of posts 104, 106. When the blade head 118 of a screwdriver (not shown) is inserted in slot 102 and that blade head is at least wider than the distance between post inner walls 112, the slot 102 is so placed and shaped that the head 118 of the screwdriver presses against posts 104, 106 as the screwdriver is turned to tighten the screw 90. Eventually, the force exerted by screwdriver head 118 against posts 104, 106 and the tightening torque applied to the screw 90 by the screwdriver head will exceed the predetermined maximum torque. The thickness of posts 104, 106 and the materials of which they are comprised and/or the manner in which those posts are secured to head 98 or secured in head 98 are all balanced and selected such that at the predetermined maximum torque, the posts will break off. In this embodiment, unlike the previous ones, the remaining screw is in a single piece. The above described deeper slot 100 remains to receive a tightening tool for removing the screw later. In the previous embodiments, the separation of the screw into the head portion and a tip portion has left two screw portions in the tapped receiving aperture. In this embodiment, however, the separated head portion is really no more than the posts 104, 106 which are completely removed from the screw upon its being tightened.

A non-limiting example of riser lug 150 in which any of the embodiments of the invention may be incorporated and which is the subject of application Ser. No. 414,697 is shown in FIGS. 11–14. The lug consists of four components, the main lug section 152, the branch or auxiliary lug section 154, the main clamping screw 20 according to the invention and the auxiliary clamping screw 50 according to the invention. Main lug section 152 is of generally U-shaped cross-section, including spaced arms 155, 156 connected by web 157. Main electric current distribution cable 158 is stripped of its external insulation at section 159, which extends through the open ended channel between arms 155, 156.

Auxiliary lug section 154 is an elongated, block-like element with parallel, tapped threaded apertures 160, 161, passing therethrough for receiving above described clamping screws 20, 50 respectively. Aperture 160 for screw 20 extends from surface 162 completely through auxiliary lug section 154 to its lower surface 163. Aperture 161 for screw 50 extends from upper surface 162 into internal recess 164 which is at one end of section 154. Appropriate interlocking formations, including axially extending channels 165, 166 in the interior surfaces of respective arms 155, 156 and complementary axially extending protrusions 167, 168 positioned along opposite sides of auxiliary lug section 154 hold lug sections 152, 154 together and those sections 152, 154 together define a housing.

Main clamping screw 20 is cooperatingly, matingly threaded with the interior surface of aperture 160 and screw 20 is tightened through lug section 154 to pass through cable channel 170 in the lug section housing to engage the stripped section 159 of cable 158 and to clamp the latter against the inner surface of web 157. Sufficient clamping force should be applied on cable 158 to ensure effective electrical connection between that cable and the lug riser 150 through arms 155, 156, web 157 and the tip 26 of screw 20. The screw 20 should not be tightened so little as to not obtain the desired secure electrical connection, nor should it be tightened so much as to damage the strands of cable section 159. This predetermined maximum permissible torque is ensured by appropriate design of screw 20 for the particular lug riser 150.

An end of branch wire 172 is also inserted into recess 164 through end aperture 173 in auxiliary section 154. Screw 50 according to the invention is tightened in cooperatingly matingly threaded aperture 161 and is tightened through that aperture until the tip 60 of screw 50 clamps cable 172 against the opposite lower surface of recess 164.

The interior surfaces of above described U-shaped member arms 155, 156 are provided with opposed shallow recesses 175, 176 respectively, which receive the portion of main clamping screw 20 that extends below auxiliary lug section 154 in FIG. 12. The cooperation between screw 20 and these recesses fixes the axial position of auxiliary section 154 relative to main lug section 152.

Although the screws according to the invention have been shown in use in one environment, it is apparent that they are adaptable for use in numerous other environments where their predetermined maximum torque characteristic could be beneficial.

Although the present invention has been described in connection with a number of preferred embodiments thereof, many variations and modifications will now become apparent to those skilled in the art. It is preferred, therefore, that the present invention be limited not by the speicfic disclosure therein, but only by the appended claims.

I claim:

1. An integral, unitary set screw adapted for being tightened up to a predetermined maximum torque, comprising:
    a helically threaded screw shaft adapted to be tightened in a matingly threaded tapped opening; a head at one end of said shaft; a tip, for engaging an object, at the opposite end of said shaft;
    a head portion extending from said head toward and part of the distance to said tip; a tip portion extending from said tip toward said head portion; said tip portion having a top side on the side thereof opposite said tip, and said tip portion top side faces toward said head portion;
    a first tightening wrench receiving bore profiled to receive and engage a wrench and also extending from said tip portion top side partially through said tip portion toward said tip;
    a second tightening wrench receiving bore profiled to receive and engage a wrench and also extending from said head completely through said head portion to said tip portion top side and meeting, being coaxial with and forming a continuous bore with said first bore; said second bore being of larger cross-section than said first bore thereby enabling said second bore to receive a larger cross-section tightening tool than is receivable by said first bore;
    a junction along said shaft and located at the junction between said tip portion top side and said head portion; said first and second bores meeting at said junction; at said junction, between the exterior of said shaft and both of said first and second bores, the material of said shaft has a rduced cross-sectional area, as compared with the cross-sectional area of the remainder of said shaft, which said reduced cross-sectional area serves to weaken said shaft to an extent that said shaft breaks at said junction to separate said head and said tip upon a tightening wrench fitted in said second bore applying more than said predetermined maximum torque.

2. The set screw of claim 1, wherein said shaft has a predetermined external diameter along its said length and at said junction, said shaft has a lesser external diameter.

3. A combination comprised of the set screw of claim 1 and a lug:
    said lug including a main lug section having a first opening therein into which an object may be passed; a tapped threaded opening extending from the exterior of said main lug section into said first opening; said lug tapped threaded opening being matingly threaded to said screw shaft;
    said screw being threadedly inserted into said lug threaded opening, such that tightening of said screw moves its said tip into said lug first opening, thereby causing said screw tip to engage whatever is in said lug first opening.

4. The combination of claim 3, and an electric conductor, wherein said lug and said screw are electrically conductive;
    said conductor extending into said lug first opening, thereby to be engaged upon tightening of said screw.

* * * * *